United States Patent
Mori

(10) Patent No.: US 11,874,135 B2
(45) Date of Patent: Jan. 16, 2024

(54) MAP GENERATION APPARATUS

(71) Applicant: Honda Motor Co., Ltd., Tokyo (JP)

(72) Inventor: Naoki Mori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 32 days.

(21) Appl. No.: 17/676,192

(22) Filed: Feb. 20, 2022

(65) Prior Publication Data

US 2022/0268598 A1 Aug. 25, 2022

(30) Foreign Application Priority Data

Feb. 25, 2021 (JP) ................................. 2021-028593

(51) Int. Cl.
*G01C 21/00* (2006.01)
*G01C 21/32* (2006.01)
*G01C 21/36* (2006.01)

(52) U.S. Cl.
CPC ......... *G01C 21/3815* (2020.08); *G01C 21/32* (2013.01); *G01C 21/3602* (2013.01); *G01C 21/387* (2020.08); *G01C 21/3841* (2020.08)

(58) Field of Classification Search
None
See application file for complete search history.

(56) References Cited

U.S. PATENT DOCUMENTS

2013/0342822 A1* 12/2013 Shiraishi ................. G01S 17/88
356/4.01
2019/0317239 A1* 10/2019 Olsson ............... G01C 21/3852
2020/0271456 A1* 8/2020 Schreier .................. G01S 19/42
2020/0280827 A1* 9/2020 Fechtel .................... H04W 4/80
(Continued)

FOREIGN PATENT DOCUMENTS

JP 2003194551 A * 7/2003
JP 2019064562 A 4/2019
(Continued)

OTHER PUBLICATIONS

Machine translation of JP-2020034321-A (Year: 2020).*
Machine translation of WO-2015072272-A1 (Year: 2015).*
Machine translation of JP-2003194551-A (Year: 2003).*

*Primary Examiner* — Anne Marie Antonucci
*Assistant Examiner* — Kyle S Park
(74) *Attorney, Agent, or Firm* — Duft & Bornsen, PC

(57) ABSTRACT

Map generation apparatus includes processor and memory. Memory stores: first/second map information of first/second map of first/second area adjacent to each other. Processor generates first/second map based on first/second traveling history of first/second vehicle in first/second area; and updates at least one of first/second map information so as to combine first/second maps. First map information includes position information of point cloud recognized based on distance information to surrounding objects acquired by first vehicle. Second map information includes position information of lane marker recognized based on image information acquired by second vehicle. Processor recognizes position of lane marker based on first map information stored in memory; and updates at least one of first/second map information stored in memory so as to combine first/second maps based on recognized position of lane marker and position information of lane marker included in second map information.

4 Claims, 7 Drawing Sheets

(56) References Cited

U.S. PATENT DOCUMENTS

2020/0363232 A1* 11/2020 Nambata .............. G05D 1/0274
2021/0039675 A1*  2/2021 Lee .................... G01C 21/3889
2021/0309231 A1* 10/2021 Fujita ................. G01C 21/3602

FOREIGN PATENT DOCUMENTS

JP          2020034321 A  *  3/2020
WO    WO-2015072272 A1 *  5/2015  ............... B60R 1/00

* cited by examiner

MAP GENERATION APPARATUS

CROSS-REFERENCE TO RELATED APPLICATION

This application is based upon and claims the benefit of priority from Japanese Patent Application No. 2021-028593 filed on Feb. 25, 2021, the content of which is incorporated herein by reference.

BACKGROUND OF THE INVENTION

Field of the Invention

This invention relates to a map generation apparatus configured to generate high-precision maps used for self-driving vehicles.

Description of the Related Art

Conventionally, an apparatus configured to perform travel control of a self-driving vehicle is known (for example, see Japanese Unexamined Patent Application Publication No. 2019-64562 (JP2019-064562A)). In an apparatus described in JP2019-064562A, a self-position of a vehicle is estimated by recognizing the outside world around the vehicle, high-precision road map information is sequentially extracted from road map information database based on the self-position, and travel control of the vehicle is performed using the extracted map information.

Meanwhile, the vehicle may travel in boundary regions of a plurality of maps adjacent to each other. However, since there is a case where an inherent error is included in the map information of adjacent maps, when the self-position is estimated as in the apparatus described in JP2019-064562A, the estimation result of the self-position may vary, and in an apparatus that controls the traveling operation based on the map information, it may be difficult to perform smooth traveling control when traveling in a boundary region of a plurality of maps.

SUMMARY OF THE INVENTION

An aspect of the present invention is a map generation apparatus, including: a processor and a memory connected to the processor. The memory is configured to store: first map information of a first map of a first area; and second map information of a second map of a second area adjacent to the first area. The processor is configured to perform: generating the first map based on a first traveling history of a first vehicle in the first area; generating the second map based on a second traveling history of a second vehicle in the second area; and updating at least one of the first map information and the second map information stored in the memory so as to combine the first map and the second map. The first map information includes position information of a point cloud recognized based on distance information to surrounding objects acquired by the first vehicle. The second map information includes position information of a lane marker recognized based on image information acquired by the second vehicle. The processor is further configured to perform: recognizing a position of the lane marker based on the first map information stored in the memory. The processor is configured to perform: the updating including updating at least one of the first map information and the second map information stored in the memory so as to combine the first map and the second map based on the position of the lane marker recognized in the recognizing and the position information of the lane marker included in the second map information.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 8. The map generation apparatus according to the embodiment of the present invention can be applied to a vehicle having a self-driving function (self-driving vehicle). The self-driving vehicle includes not only a vehicle that performs only traveling in an automatic driving mode in which a driving operation by a driver is unnecessary, but also a vehicle that performs traveling in an automatic driving mode and traveling in a manual driving mode by a driving operation by a driver.

Figure 1:
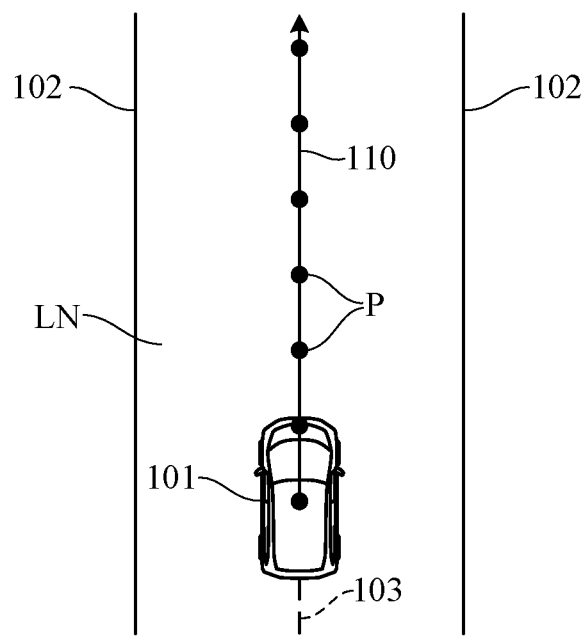
FIG. 1 is a diagram illustrating an example of a travel scene of a self-driving vehicle to which a map generation apparatus according to an embodiment of the present invention is applied.

FIG. 1 is a diagram illustrating an example of a travel scene of a self-driving vehicle (hereinafter, a vehicle) 101. FIG. 1 illustrates an example in which the vehicle 101 travels (lane-keep travel) while following a lane so as not to deviate from a lane LN defined by lane markers 102. Note that the vehicle 101 may be any of an engine vehicle having an internal combustion engine as a traveling drive source, an electric vehicle having a traveling motor as a traveling drive source, and a hybrid vehicle having an engine and a traveling motor as traveling drive sources.

Figure 2:
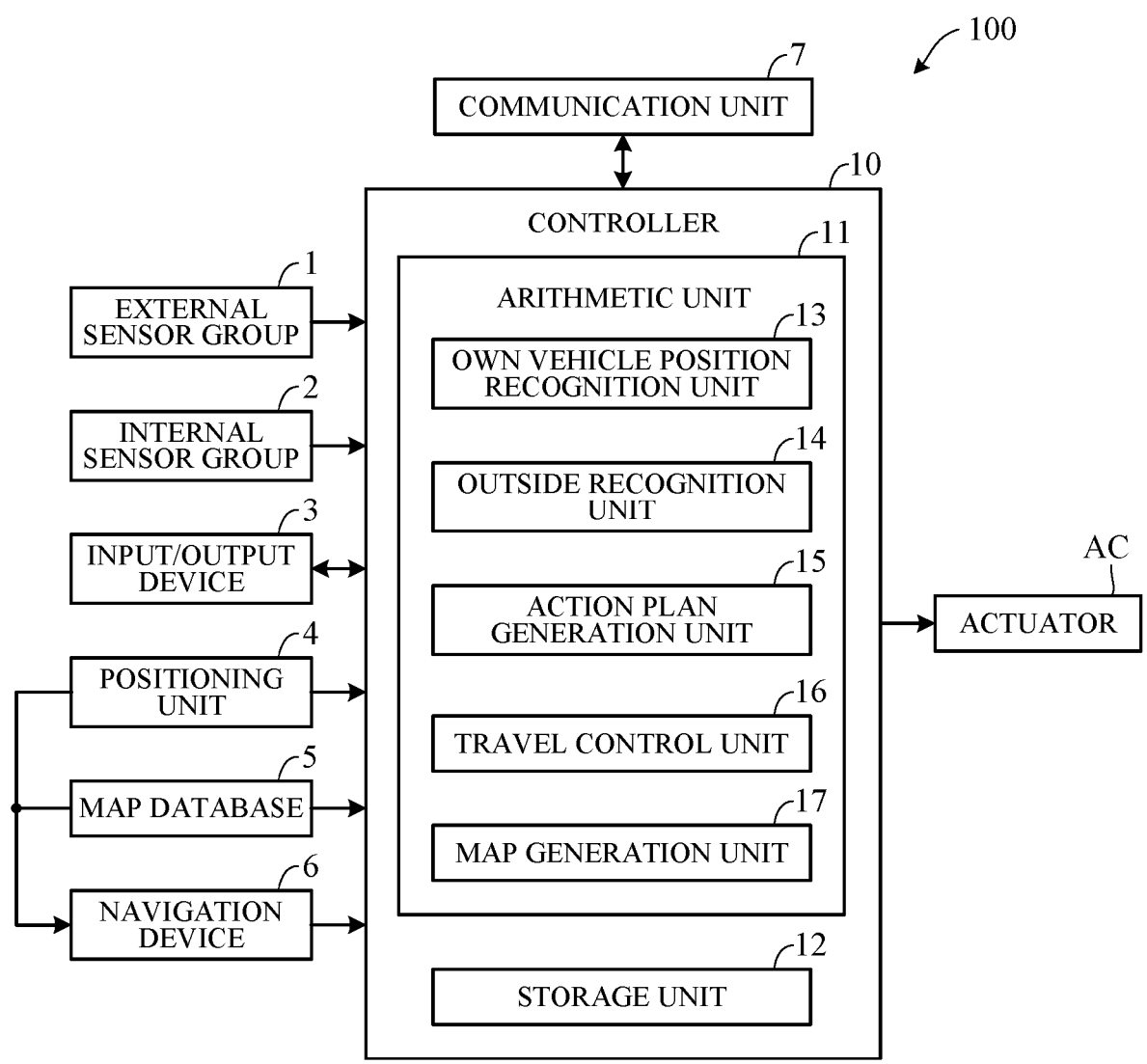
FIG. 2 is a block diagram schematically illustrating an overall configuration of a vehicle control system of the self-driving vehicle to which the map generation apparatus according to the embodiment of the present invention is applied.

FIG. 2 is a block diagram schematically illustrating an overall configuration of a vehicle control system 100 of the vehicle 101 to which a map generation apparatus according to the present embodiment is applied. As illustrated in FIG. 1, the vehicle control system 100 mainly includes a controller 10, an external sensor group 1, an internal sensor group 2, an input/output device 3, a positioning unit 4, a map database 5, a navigation device 6, a communication unit 7, and a traveling actuator AC each electrically connected to the controller 10.

The external sensor group 1 is a generic term for a plurality of sensors (external sensors) that detect an external situation which is peripheral information of the vehicle 101 (FIG. 1). For example, the external sensor group 1 includes a LiDAR that measures a distance to an object such as a surrounding vehicle or an obstacle based on a time until laser irradiation is performed around the vehicle 101 and reflected light is received, a radar that measures a distance to an object based on a time until electromagnetic wave irradiation is performed and reflected wave is detected, and a camera that includes an imaging element such as a CCD or a CMOS and captures an image around the vehicle 101.

The internal sensor group 2 is a generic term for a plurality of sensors (internal sensors) that detect a traveling state of the vehicle 101. For example, the internal sensor group 2 includes a vehicle speed sensor that detects the vehicle speed of the vehicle 101, an acceleration sensor that detects the acceleration in the front-rear direction and the acceleration (lateral acceleration) in the left-right direction of the vehicle 101, a rotation speed sensor that detects the rotation speed of the traveling drive source, a yaw rate sensor that detects the rotation angular speed around the vertical axis of the center of gravity of the vehicle 101, and the like. The internal sensor group 2 further includes a sensor that detects driver's driving operation in a manual driving mode, for example, operation of an accelerator pedal, operation of a brake pedal, operation of a steering wheel, and the like.

The input/output device 3 is a generic term for devices to which a command is input from a driver or from which information is output to the driver. For example, the input/output device 3 includes various switches to which the driver inputs various commands by operating an operation member, a microphone to which the driver inputs a command by voice, a display that provides information to the driver with a display image, a speaker that provides information to the driver by voice, and the like.

The positioning unit (GNSS unit) 4 has a positioning sensor that receives a positioning signal transmitted from a positioning satellite. The positioning satellite is an artificial satellite such as a GPS satellite or a quasi-zenith satellite. The positioning unit 4 measures a current position (latitude, longitude, altitude) of the vehicle 101 by using the positioning information received by the positioning sensor.

The map database 5 is a device that stores general map information used in the navigation device 6, and is constituted of, for example, a hard disk or a semiconductor element. The map information includes road position information, information on a road shape (curvature or the like), and position information on intersections and branch points. The map information stored in the map database 5 is different from high-precision map information stored in a storage unit 12 of the controller 10.

The navigation device 6 is a device that searches for a target route on a road to a destination input by a driver and provides guidance along the target route. The input of the destination and the guidance along the target route are performed via the input/output device 3. The target route is calculated based on a current position of the vehicle 101 measured by the positioning unit 4 and the map information stored in the map database 5. The current position of the vehicle 101 can be measured using the detection values of the external sensor group 1, and the target route may be calculated based on the current position and the high-precision map information stored in the storage unit 12.

The communication unit 7 communicates with various servers (not illustrated) via a network including a wireless communication network represented by the Internet network, a mobile phone network, or the like, and acquires map information, travel history information, traffic information, and the like from the servers periodically or at an arbitrary timing. The travel history information of the vehicle 101 may be transmitted to the server via the communication unit 7 in addition to the acquisition of the travel history information. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the storage unit 12, and the map information is updated.

The actuator AC is a traveling actuator for controlling traveling of the vehicle 101. When the traveling drive source is an engine, the actuator AC includes a throttle actuator that adjusts an opening degree of a throttle valve of the engine and an injector actuator that adjusts a valve opening timing and a valve opening time of the injector. When the traveling drive source is a traveling motor, the traveling motor is included in the actuator AC. The actuator AC also includes a brake actuator that operates the braking device of the vehicle 101 and a steering actuator that drives the steering device.

The controller 10 includes an electronic control unit (ECU). More specifically, the controller 10 includes a computer including an arithmetic unit 11 such as a CPU (microprocessor), the storage unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, the controller 10 is illustrated, in FIG. 2, as a set of these ECUs for convenience.

The storage unit 12 stores high precision detailed map information for self-traveling. The high-precision map information includes point cloud map information including the position information of the point cloud recognized based on the distance to the object measured by the LiDAR and road map information including the position information of the lane marker 102 recognized based on the image information captured by the camera. The point cloud map information also includes information of a road surface profile such as unevenness of a road surface recognized based on the position information of the point cloud. The road map information also includes road position information, information on a road shape (curvature or the like), information on a road gradient, position information on intersections and branch points, information on the type of the lane marker 102 such as a white line, information on the number of lanes, information on the width of a lane and the position of each lane (information on the center position of a lane and the boundary line of the lane position), position information on a landmark (traffic lights, signs, buildings, etc.) as a mark on the map, and the like.

The high-precision map information stored in the storage unit 12 includes map information (referred to as external map information) acquired from the outside of the vehicle 101 via the communication unit 7 and map information (referred to as internal map information) created by the vehicle 101 itself using detection values of the external sensor group 1 or detection values of the external sensor group 1 and the internal sensor group 2.

The external map information is, for example, map information generated based on travel history information collected by a dedicated surveying vehicle or a general self-driving vehicle traveling on a road and distributed to the general self-driving vehicle via a cloud server, or map information acquired from another self-driving vehicle by vehicle-to-vehicle communication. The map information from the cloud server is generated for an area with a large traffic volume such as a highway or an urban area, but is not generated for an area with a small traffic volume such as a residential area or a suburb.

On the other hand, the internal map information is map information generated based on travel history information collected by each self-driving vehicle (vehicle 101) traveling on a road, and is map information used for self-driving of the vehicle 101 (for example, map information possessed by the vehicle 101 alone). In a region where no map information is provided from the cloud server, such as a newly constructed road, an internal map is created by the vehicle 101 itself. The internal map information of each self-driving vehicle may be provided to another self-driving vehicle as external map information via the inter-vehicle communication.

The storage unit 12 also stores information such as various control programs and a threshold used in the programs.

The arithmetic unit 11 includes an own vehicle position recognition unit 13, an outside recognition unit 14, an action plan generation unit 15, a travel control unit 16, and a map generation unit 17 as functional configurations. In other words, the arithmetic unit 11 such as a CPU (microprocessor) of the controller 10 functions as the own vehicle position recognition unit 13, outside recognition unit 14, action plan generation unit 15, travel control unit 16, and map generation unit 17.

The own vehicle position recognition unit 13 recognizes the position of the vehicle 101 on the map (own vehicle position) with high accuracy based on the high-precision map information (point cloud map information, road map information) stored in the storage unit 12 and the peripheral information of the vehicle 101 detected by the external sensor group 1. When the own vehicle position can be measured by a sensor installed on the road or outside a road side, the own vehicle position can be recognized by communicating with the sensor via the communication unit 7. The own vehicle position may be recognized using the position information of the vehicle 101 obtained by the positioning unit 4. The movement information (moving direction, moving distance) of the own vehicle may be calculated based on the detection values of the internal sensor group 2, and the own vehicle position may be recognized accordingly.

The outside recognition unit 14 recognizes an external situation around the vehicle 101 based on the signal from the external sensor group 1 such as a LiDAR, a radar, and a camera. For example, the position, speed, and acceleration of a surrounding vehicle (a front vehicle or a rear vehicle) traveling around the vehicle 101, the position of a surrounding vehicle stopped or parked around the vehicle 101, and the positions and states of other objects are recognized. Other objects include signs, traffic lights, signs such as lane markers 102 (white lines, etc.) or stop lines on roads, buildings, guardrails, utility poles, signboards, pedestrians, bicycles, and the like. The states of other objects include a color of a traffic light (red, green, yellow), the moving speed and direction of a pedestrian or a bicycle, and the like. A part of the stationary object among the other objects constitutes a landmark serving as an index of the position on the map, and the outside recognition unit 14 also recognizes the position and type of the landmark. The outside recognition unit 14 recognizes a road surface or a surface of a roadside object and the like as a point cloud based on a distance to an object measured by a LiDAR as the external sensor group 1, and recognizes a contour of the lane marker 102, the roadside object, or the like based on the image information captured by the camera as the external sensor group 1.

The action plan generation unit 15 generates a traveling path (target path) of the vehicle 101 from a current point of time to a predetermined time ahead based on, for example, the target route calculated by the navigation device 6, the high-precision map information stored in the storage unit 12, the own vehicle position recognized by the own vehicle position recognition unit 13, and the external situation recognized by the outside recognition unit 14. More specifically, the target path of the vehicle 101 is generated on the point cloud map or the road map based on the point cloud map information or the road map information stored in the storage unit 12. When there are a plurality of paths that are candidates for the target path on the target route, the action plan generation unit 15 selects, from the plurality of paths, an optimal path that satisfies criteria such as compliance with laws and regulations and efficient and safe traveling, and sets the selected path as the target path. Then, the action plan generation unit 15 generates an action plan corresponding to the generated target path.

The action plan includes travel plan set for each unit time (for example, 0.1 seconds) from a current point of time to a predetermined time (for example, 5 seconds) ahead, that is, travel plan set in association with a time for each unit time. The travel plan includes information on an own vehicle position of the vehicle 101 and information on a vehicle state per unit time. The own vehicle position information is, for example, two-dimensional coordinate position information on a road, and the vehicle state information is vehicle speed information indicating a vehicle speed, direction information indicating a direction of the vehicle 101, and the like. Therefore, when the vehicle is supposed to accelerate to a target vehicle speed within a predetermined time, the information of the target vehicle speed is included in the action plan. The vehicle state can be obtained from a change in the own vehicle position per unit time. The travel plan is updated every unit time.

FIG. 1 illustrates an example of the action plan generated by the action plan generation unit 15, that is, a travel plan of a scene in which the vehicle 101 travels in the lane-keep travel so as not to deviate from the lane LN. Each point P in FIG. 1 corresponds to the own vehicle position for each unit time from the current point in time to a predetermined time ahead, and the target path 110 is obtained by connecting these points P in time order. The target path 110 is generated, for example, along the center line 103 of the pair of lane markers 102 defining the lane LN. The target path 110 may be generated along a past travel path (travel track) included in the map information. Note that the action plan generation unit 15 generates various action plans corresponding to overtaking travel in which the vehicle 101 moves to another lane and overtakes the preceding vehicle, lane change travel in which the vehicle moves to another lane, deceleration travel, acceleration travel, or the like, in addition to the lane-keep travel. When generating the target path 110, the action plan generation unit 15 first determines a travel mode and generates the target path 110 based on the travel mode. The information on the target path 110 generated by the action plan generation unit 15 is added to the map information and stored in the storage unit 12, and is taken into consideration when the action plan generation unit 15 generates an action plan at the time of the next travel.

In the self-driving mode, the travel control unit 16 controls each of the actuators AC so that the vehicle 101 travels along the target path 110 generated by the action plan generation unit 15. More specifically, the travel control unit 16 calculates a requested driving force for obtaining the target acceleration for each unit time calculated by the action plan generation unit 15 in consideration of travel resistance determined by a road gradient or the like in the self-driving mode. Then, for example, the actuator AC is feedback controlled so that an actual acceleration detected by the internal sensor group 2 becomes the target acceleration. That is, the actuator AC is controlled so that the vehicle 101 travels at the target vehicle speed and the target acceleration. In the manual driving mode, the travel control unit 16 controls each actuator AC in accordance with a travel command (steering operation or the like) from the driver acquired by the internal sensor group 2.

The map generation unit 17 generates three-dimensional high-precision map information (internal map information) in an absolute latitude-longitude coordinate system by using the detection values detected by the external sensor group 1 and the current position (absolute latitude-longitude) of the vehicle 101 measured by the positioning unit 4. In a case where a LiDAR is used as the external sensor group 1, a road surface or a surface of a roadside object or the like that is a subject is recognized as a point group based on an irradiation direction of a laser and a time until reflected light is received, and point cloud map information including position information of the point cloud in an absolute latitude-longitude coordinate system is generated. The point cloud map information also includes information on reflection intensity for each point cloud detected based on laser irradiation intensity and light reception intensity. The map generation unit 17 sequentially plots the position information of the point cloud on the point cloud map, thereby generating the point cloud map information around the road on which the vehicle 101 has traveled. Note that the point cloud map information may be generated using a radar instead of the LiDAR.

On the other hand, in a case where a camera is used as the external sensor group 1, contours of the lane marker 102, the roadside object, and the like are extracted based on luminance and color information of each pixel included in the image information from the camera, and road map information including position information of the lane marker 102 in the absolute latitude-longitude coordinate system is generated. The map generation unit 17 sequentially plots the position information of the lane markers 102 on the road map, thereby generating road map information around the road on which the vehicle 101 has traveled. The map generation unit 17 may update the high-precision map information stored in the storage unit 12 with the contour or point cloud of the newly recognized lane marker 102, roadside object, or the like.

Figure 3:
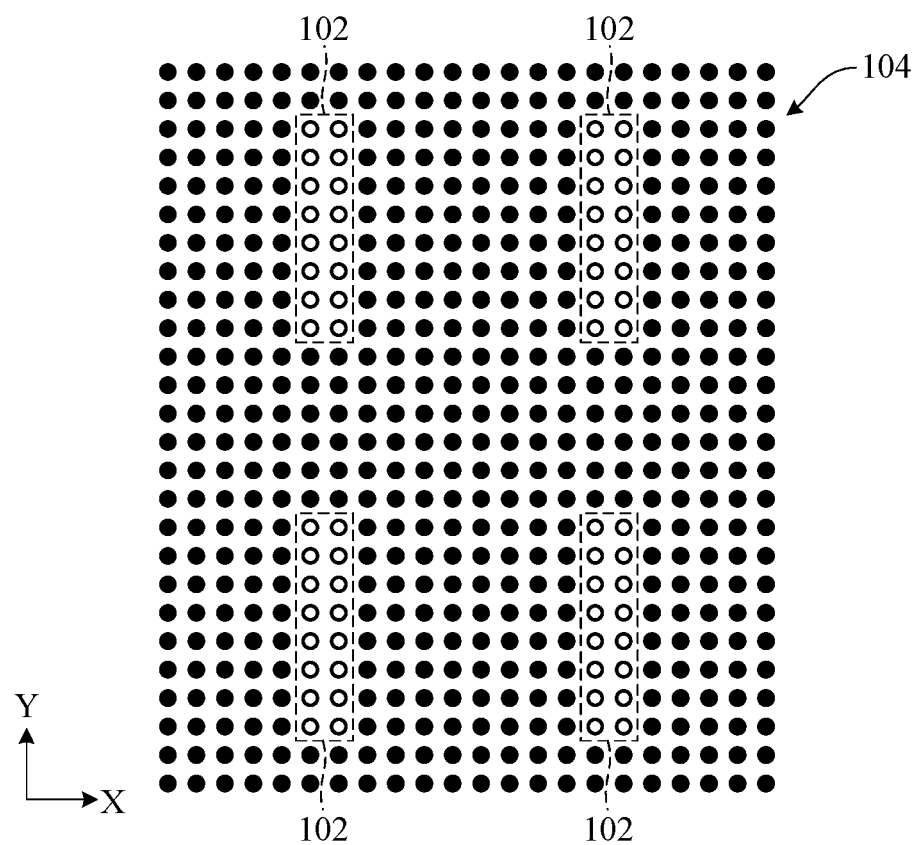
FIG. 3 is a diagram for describing point cloud map information generated by the map generation unit and stored in a storage unit of FIG. 2.
Figure 4:
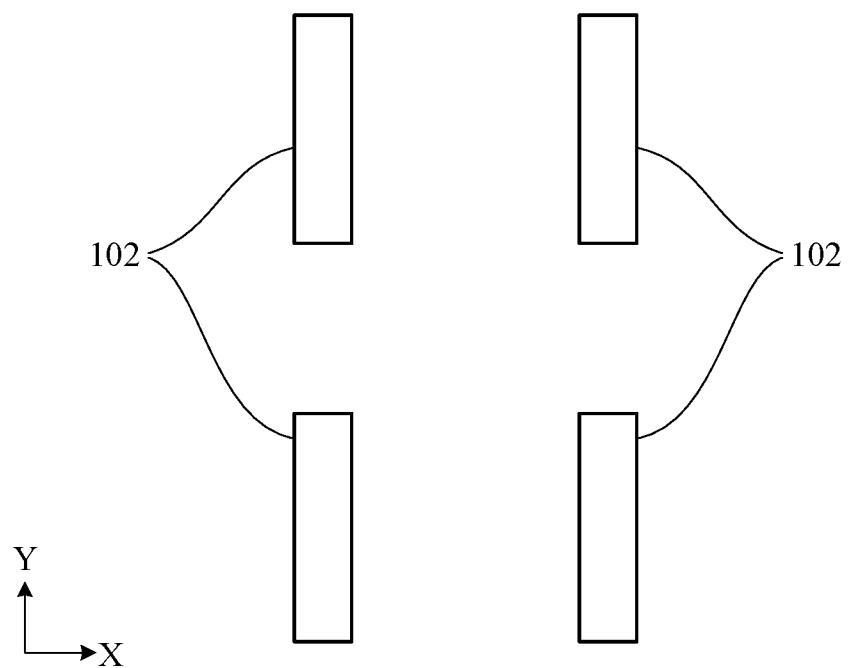
FIG. 4 is a diagram for describing road map information generated by the map generation unit and stored in the storage unit of FIG. 2.

FIGS. 3 and 4 are diagrams for describing high-precision map information generated by the map generation unit 17. FIG. 3 illustrates point cloud map information generated using a LiDAR as the external sensor group 1, and FIG. 4 illustrates road map information generated using a camera as the external sensor group 1. As illustrated in FIG. 3, the point cloud map information is configured as position information of a point cloud corresponding to a road surface 104 or a surface of a roadside object or the like in an absolute latitude-longitude coordinate system (XY coordinate system). Each lane marker 102 in the point cloud map information is recorded not as a single object but as a point cloud corresponding to each lane marker 102. On the other hand, as illustrated in FIG. 4, the road map information is configured as position information of the contour of an object such as a lane marker 102 or a roadside object in an absolute latitude-longitude coordinate system (XY coordinate system), and each lane marker 102 in the road map information is recorded as a single object.

The own vehicle position recognition unit 13 performs own vehicle position estimation processing in parallel with the map generation processing by the map generation unit 17. That is, the point cloud recognized by the outside recognition unit 14 using the LiDAR as the external sensor group 1 is collated with the point cloud included in the point cloud map information (high-precision map information), and the own vehicle position is estimated based on the collation result. Alternatively, the contour of the object such as the lane marker 102 or the roadside object recognized using the camera as the external sensor group 1 is collated with the contour of the object such as the lane marker 102 or the roadside object included in the road map information (high-precision map information), and the own vehicle position is estimated based on the collation result. The map creation processing and the position estimation processing are simultaneously performed, for example, according to an algorithm of SLAM.

Figure 5:
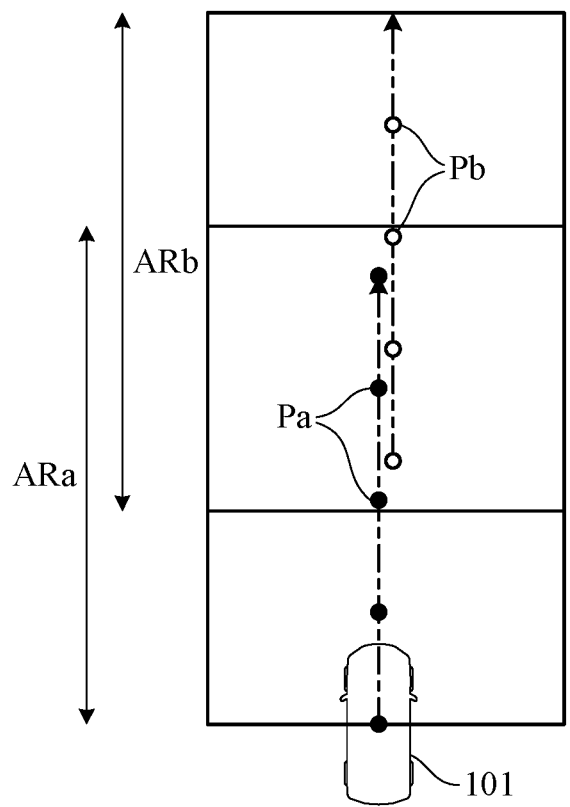
FIG. 5 is a diagram illustrating an example of a traveling scene of the self-driving vehicle assumed by the map generation apparatus according to the embodiment of the present invention.

A configuration of the map generation apparatus according to the present embodiment will be described. FIG. 5 is a diagram illustrating an example of a traveling scene of the vehicle 101 assumed by the map generation apparatus according to the present embodiment, and illustrates a scene in which the vehicle 101 travels in the lane-keep travel so as not to deviate from the lane LN as in FIG. 1. Hereinafter, the area that the point cloud map information is stored in the storage unit 12 is referred to as a point cloud map area ARa, and the area that the road map information is stored in the storage unit 12 is referred to as a road map area ARb. For example, it is assumed that point cloud map information generated on the vehicle 101 side is stored in the storage unit 12 as the internal map information, and road map information acquired from another self-driving vehicle by vehicle-to-vehicle communication is stored in the storage unit 12 as the external map information.

Each piece of map information includes an inherent error due to a measurement error of absolute latitude and longitude when the map is generated. Therefore, as illustrated in FIG. 5, the own vehicle position Pa recognized based on the point cloud map information by the own vehicle position recognition unit 13 may not coincide with the own vehicle position Pb recognized based on the road map information. In this case, the recognition results of the own vehicle positions Pa and Pb vary at the timing when the map information used for the recognition of the own vehicle position by the own vehicle position recognition unit 13 is switched.

In this manner, it may be difficult to perform smooth travel control of the vehicle 101 when the vehicle travels in the self-driving mode in the boundary region between the point cloud map area ARa and the road map area ARb in a state where the recognition result of the own vehicle position varies. For example, when the recognition result of the own vehicle position varies in the traveling direction of the vehicle 101, and the own vehicle position is switched from the point Pa behind in the traveling direction to the point Pb ahead in the traveling direction at the timing when the map information is switched, it is erroneously recognized that the vehicle 101 has traveled too much with respect to the travel plan. In this case, the vehicle 101 may perform sudden decelerating or sudden braking, which causes discomfort to the occupant of the vehicle 101 and the surrounding vehicle.

Similarly, when the variation in the recognition result of the own vehicle position occurs in the opposite direction of the traveling direction of the vehicle 101, the vehicle 101 is erroneously recognized as being delayed with respect to the travel plan, and the vehicle 101 may be suddenly accelerated. In addition, when the variation in the recognition result of the own vehicle position occurs in the vehicle width direction of the vehicle 101, the vehicle 101 may be erroneously recognized as deviating from the target path 110, and the vehicle 101 may make a sudden turn.

Therefore, according to the present embodiment, an error unique to a plurality of maps is grasped as a relative positional relationship between the maps, and the plurality of maps are accurately combined so that a recognition result of the own vehicle position does not vary. In other words, the map generation apparatus is configured as follows so that variations in the recognition result of the vehicle position can be eliminated by accurately combining the plurality of maps in advance, and smooth travel control can be performed when traveling in the boundary regions of the plurality of maps.

Figure 6:
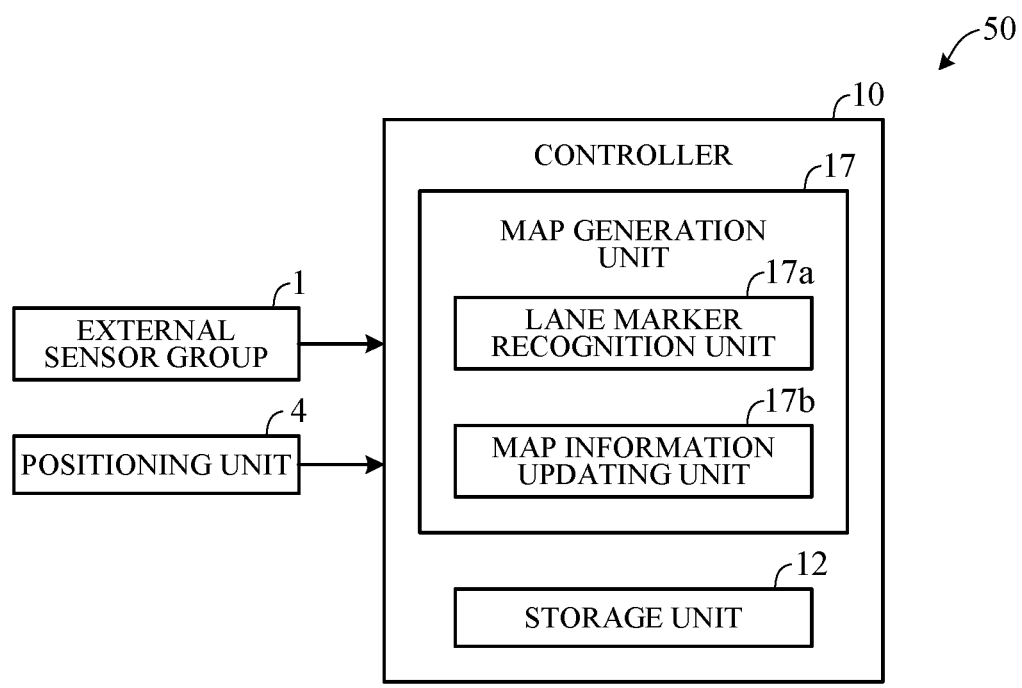
FIG. 6 is a block diagram illustrating a main part configuration of the map generation apparatus according to the embodiment of the present invention.

FIG. 6 is a block diagram illustrating a main part configuration of the map generation apparatus 50 according to the embodiment of the present invention. The map generation apparatus 50 constitutes a part of the vehicle control system 100 in FIG. 2. As illustrated in FIG. 6, the map generation apparatus 50 includes the controller 10, external sensor group 1, and positioning unit 4. The controller 10 in FIG. 6 includes a lane marker recognition unit 17a and a map information updating unit 17b as functional configurations carried by the map generation unit 17 (FIG. 2) of the arithmetic unit 11. That is, the arithmetic unit 11 such as a CPU (microprocessor) of the controller 10 functions as the lane marker recognition unit 17a and the map information updating unit 17b. In the storage unit 12 of FIG. 6, the point cloud map information of the point cloud map area ARa and the road map information of the road map area ARb are stored in advance.

The lane marker recognition unit 17a recognizes the position of the lane marker 102 based on the point cloud map information (FIG. 3) stored in the storage unit 12. More specifically, first, a point cloud corresponding to the road surface 104 on the XY plane is extracted based on the position information of the point cloud included in the point cloud map information. Next, based on the information on the reflection intensity of the point cloud included in the point cloud map information, a point cloud having a reflection intensity equal to or higher than a predetermined intensity among the extracted point clouds corresponding to the road surface 104 is recognized as the lane marker 102. Since the reflection intensity of the point cloud corresponding to the lane marker 102 such as a white line is higher than the reflection intensity of the point cloud corresponding to the road surface 104 other than the lane marker 102, the point cloud corresponding to the lane marker 102 can be extracted by setting in advance an appropriate reflection intensity threshold for identifying reflection intensities.

Figure 7:
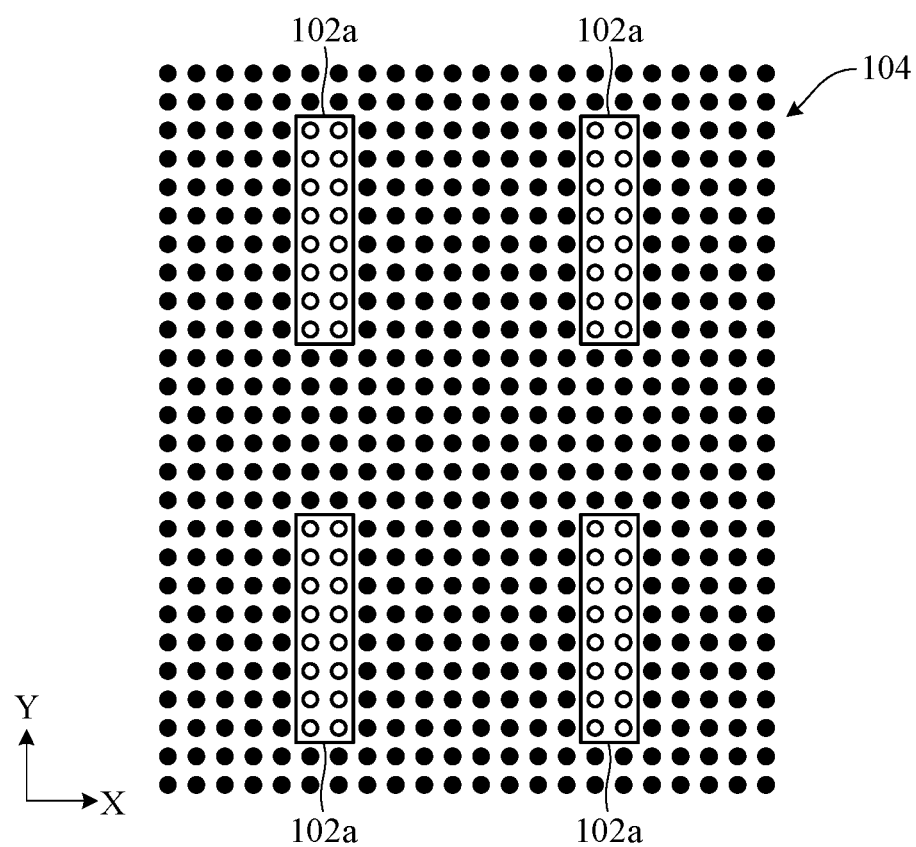
FIG. 7 is a diagram for explaining updating of map information by the map information updating unit of FIG. 6.

FIG. 7 is a diagram for explaining updating of map information by the map information updating unit 17b. As illustrated in FIG. 7, the map information updating unit 17b sets the contour line surrounding the point cloud corresponding to the lane marker 102 extracted by the lane marker recognition unit 17a as the lane marker object 102a corresponding to the contour of the lane marker 102, and adds the position information to the point cloud map information. In other words, the lane marker object 102a surrounding the point cloud corresponding to the lane marker 102 is superimposed on the point cloud map, and the point cloud map information stored in the storage unit 12 is updated.

Further, the map information updating unit 17b updates at least one of the point cloud map information and the road map information stored in the storage unit 12 so as to combine the point cloud map and the road map based on the point cloud map information and the road map information stored in the storage unit 12. More specifically, the absolute latitude and longitude of any piece of map information is corrected and the map information is updated as necessary so that the lane marker object 102a on the point cloud map and the lane marker 102 on the road map are smoothly connected. For example, the map information is corrected by determining the translational movement amount of one map in the absolute latitude-longitude coordinate system and the rotational movement amount around the reference point of the map.

In this manner, by correcting the map information so that the lane marker object 102a on the point cloud map and the lane marker 102 on the road map are smoothly connected to each other, the point cloud map and the road map can be accurately combined regardless of an inherent error included in each map. As a result, the plurality of maps used for the traveling control in the self-driving mode are accurately combined in advance, and the variation in the recognition results of the own vehicle positions Pa and Pb generated at the timing when the map information is switched (FIG. 5) is eliminated, so that the smooth traveling control can be performed when the own vehicle travels in the boundary regions of the plurality of maps.

Note that the updated map information stored in the storage unit 12 may be transmitted to another self-driving vehicle by inter-vehicle communication, or may be transmitted to a map information management server or the like provided outside the vehicle 101. In this case, the internal map information generated on the vehicle 101 side can be shared in an effective manner.

Figure 8:
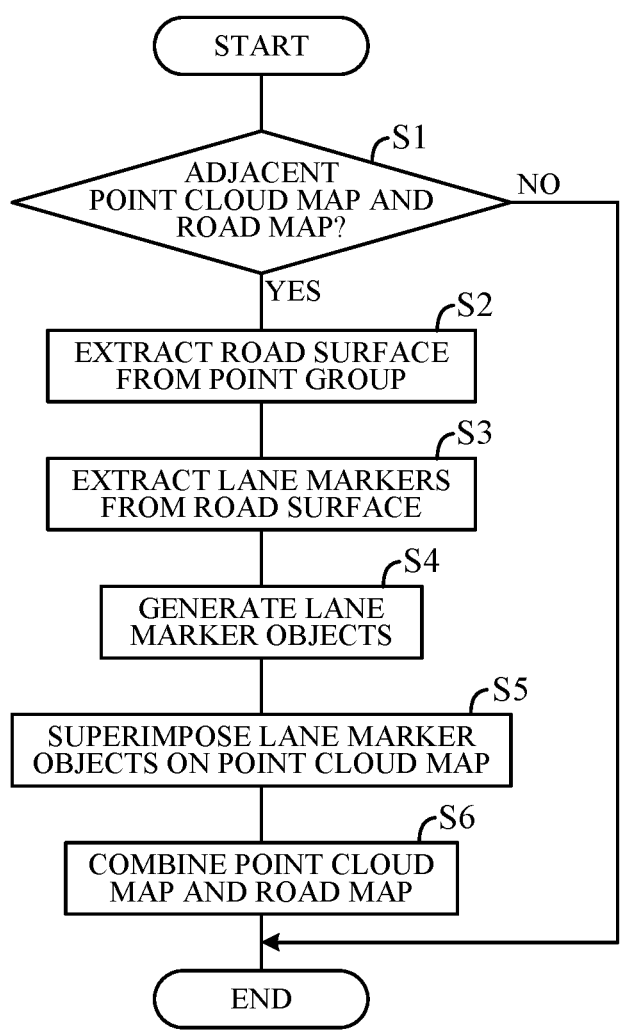
FIG. 8 is a flowchart illustrating an example of processing executed by a controller of FIG. 6.

FIG. 8 is a flowchart illustrating an example of processing executed by the controller 10 of FIG. 6. The processing illustrated in this flowchart is started when, for example, new internal map information is generated on the vehicle 101 side, or new external map information is acquired from the outside of the vehicle 101, and new high-precision map information is stored in the storage unit 12. First, in S1 (S: processing step), the high-precision map information stored in the storage unit 12 is read, and the presence or absence of the point cloud map information and the road map information of the point cloud map area ARa and the road map area ARb adjacent to each other is determined. When the determination result is positive in S1, the process proceeds to S2, and when the determination result is negative, the process ends.

In S2, a point group corresponding to the road surface 104 is extracted from the point group of the point cloud map area ARa based on the point cloud map information stored in the storage unit 12. Next, in S3, point groups corresponding to the lane markers 102 are extracted from the point cloud corresponding to the road surface 104 extracted in S2. Next, in S4, lane marker objects 102a surrounding the point cloud (point groups) corresponding to the lane markers 102 extracted in S3 are generated. Next, in S5, the lane marker objects 102a are superimposed on the point cloud map to update the point cloud map information stored in the storage unit 12. Next, in S6, the point cloud map and the road map are combined so that the lane marker object 102a on the point cloud map and the lane marker 102 on the road map are smoothly connected, the map information stored in the storage unit 12 is updated, and the processing is terminated.

In this manner, the point cloud map and the road map can be accurately combined by correcting and updating the map information as necessary so that the lane marker object 102a on the point cloud map and the lane marker 102 on the road map are smoothly connected. In addition, by accurately combining the point cloud map and the road map in advance, smooth traveling control can be performed when traveling in the self-driving mode in the boundary region between the point cloud map area ARa and the road map area ARb. In other words, by accurately combining a plurality of maps used for travel control in the self-driving mode in advance, it is possible to eliminate variations in recognition results of the own vehicle positions Pa and Pb that occur at the timing when the map information is switched, and to perform smooth travel control when traveling in boundary regions of the plurality of maps.

The present embodiment can achieve advantages and effects such as the following:

(1) The map generation apparatus 50 includes: the map generation unit 17 configured to generate the high-precision map based on the traveling history of the vehicle 101 in the point cloud map area ARa and the traveling history of other self-driving vehicles in the road map area ARb adjacent to the point cloud map area ARa; the storage 12 configured to store the internal map information (point cloud map information) generated based on the traveling history of the vehicle 101 and the external map information (road map information) generated based on the traveling history of other self-driving vehicles; and the map information updating unit 17b configured to update at least one of the point cloud map information and the road map information stored in the storage 12 so as to combine the point cloud map and the road map (FIG. 6).

The point cloud map information includes the position information of the point cloud recognized based on the distance information to the surrounding objects acquired by the vehicle 101. The road map information includes the position information of the lane marker 102 recognized based on the image information acquired by other self-driving vehicles. The map generation unit 17 includes: the lane marker recognition unit 17a configured to recognize the position of the lane marker 102 based on the point cloud map information stored in the storage 12 (FIG. 6). The map information updating unit 17b updates at least one of the point cloud map information and the road map information stored in the storage 12 so as to combine the point cloud map and the road map based on the position of the lane marker 102 recognized by the lane marker recognition unit 17a and the position information of the lane marker 102 included in the road map information.

In other words, the point cloud map and the road map can be accurately combined by correcting any map information as necessary so that the lane marker object 102a corresponding to the lane marker 102 recognized on the point cloud map is smoothly connected to the lane marker 102 on the road map. As described above, by accurately combining a plurality of maps for self-driving in advance, it is possible to eliminate variations in the recognition result of the position of the own vehicle that occur at the timing when the map information is switched, and to perform smooth traveling control when traveling in the self-driving mode in the boundary regions of the plurality of maps.

(2) The point cloud map information further includes: the reflection intensity information of the point cloud. The lane marker recognition unit 17a extracts the point cloud corresponding to the road surface 104 based on the position information of the point cloud included in the point cloud map information, and recognizes the point cloud having a predetermined reflection intensity or higher as the lane marker 102 from among the extracted point cloud based on the reflection intensity information of the point cloud included in the point cloud map information. By using the position information and the reflection intensity information, the lane marker 102 can be recognized as one object based on the point cloud map information generated using the LiDAR.

(3) The map information updating unit 17b updates the point cloud map information by adding the position information of the lane marker object 102a corresponding to the lane marker 102 recognized by the lane marker recognition unit 17a to the point cloud map information. In other words, the lane marker object 102a is superimposed on the point cloud map, and the point cloud map information stored in the storage unit 12 is updated. By adding the position information of the lane marker object 102a to the point cloud map information itself in this manner, for example, the road map and the point cloud map generated and acquired thereafter can be combined.

The above embodiment may be modified into various forms. Hereinafter, some modifications will be described. In the above embodiment, an example in which the point cloud map that is the internal map generated on the vehicle 101 side and the road map that is the external map acquired from the outside of the vehicle 101 are combined has been described, but a first map and a second map are not limited to such a configuration. For example, a road map that is an internal map generated on the vehicle 101 side and a point cloud map that is an external map acquired from the outside of the vehicle 101 may be combined. The point cloud map, which is a plurality of internal maps generated by division on the vehicle 101 side, and the road map may be combined. The point cloud map, which is a plurality of external maps acquired from the outside of the vehicle 101, and the road map may be combined. In addition, an example in which an internal map generated on the vehicle 101 side and an external map acquired from another self-driving vehicle by vehicle-to-vehicle communication are combined has been described. However, the internal map and the external map distributed from a cloud server may be combined.

In the above embodiment, the example in which the map generation apparatus 50 constitutes a part of the vehicle control system 100 has been described, but the map generation apparatus is not limited to such a device. For example, it may constitute a part of a map information management server or the like provided outside the vehicle 101. In this case, for example, the point cloud map and the road map acquired from each vehicle are combined on the server side.

In the above embodiment, an example in which the deviation between the point cloud map and the road map occurs on a plane has been described with reference to FIG. 5 and the like, but a similar method can also be applied to a case where the deviation between the point cloud map and the road map occurs in the height direction.

The above embodiment can be combined as desired with one or more of the above modifications. The modifications can also be combined with one another.

According to the present invention, since a plurality of maps can be accurately combined, variations in recognition results of vehicle positions are eliminated, and smooth traveling control can be performed when traveling in boundary regions of a plurality of maps.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus, comprising:
a processor and a memory connected to the processor, wherein
the memory is configured to store:
first map information of a first map of a first area, the first map information including position information and reflection intensity information of a point cloud recognized based on distance information to surrounding objects acquired by a first vehicle; and
second map information of a second map of a second area adjacent to the first area, the second map information including position information of a lane marker recognized based on image information acquired by a second vehicle, wherein
the processor is configured to perform:
generating the first map based on a first traveling history of the first vehicle in the first area;
generating the second map based on a second traveling history of the second vehicle in the second area;
extracting a first point cloud corresponding to a road surface based on the position information of the point cloud included in the first map information;
extracting a second point cloud having a predetermined reflection intensity or higher from among the first point cloud based on the reflection intensity information of the point cloud included in the first map information;
recognizing the second point cloud as the lane marker;
generating a contour line surrounding the second point cloud as a lane marker object corresponding to a contour of the lane marker; and
updating at least one of the first map information and the second map information stored in the memory so as to smoothly connect the lane marker object and the lane marker included in the second map information.

2. The map generation apparatus according to claim 1, wherein
the processor is configured to perform:
the updating including updating the first map information by adding position information of the lane marker object to the first map information.

3. The map generation apparatus according to claim 1, wherein
the processor is configured to perform:
the updating including:
updating the first map information stored in the memory by superimposing the lane marker object on the first map.

4. The map generation apparatus according to claim 1, wherein
the processor is configured to perform:
the updating including updating at least one of the first map information and the second map information stored in the memory by determining a translational moving amount and a rotational moving amount of at least one of the first map and the second map in an absolute latitude-longitude coordinate.

* * * * *